(12) United States Patent
Jin et al.

(10) Patent No.: US 12,665,686 B2
(45) Date of Patent: Jun. 23, 2026

(54) METHOD FOR PREDICTING CHANNEL STATE INFORMATION AND APPARATUS

(71) Applicant: HUAWEI TECHNOLOGIES CO., LTD., Shenzhen (CN)

(72) Inventors: Huangping Jin, Shanghai (CN); Shi Jin, Nanjing (CN); Xiang Ren, Shanghai (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 638 days.

(21) Appl. No.: 17/891,267

(22) Filed: Aug. 19, 2022

(65) Prior Publication Data

US 2022/0407616 A1 Dec. 22, 2022

Related U.S. Application Data

(63) Continuation of application No. PCT/CN2020/076282, filed on Feb. 21, 2020.

(51) Int. Cl.
*H04B 17/373* (2015.01)
*H04W 24/08* (2009.01)

(52) U.S. Cl.
CPC .......... *H04B 17/373* (2015.01); *H04W 24/08* (2013.01)

(58) Field of Classification Search
CPC ............... H04B 17/373; H04B 7/0626; H04B 17/3913; H04B 7/0413; H04W 24/08; H04L 25/0222; H04L 25/0224; H04L 25/023
USPC ........................................ 370/252
See application file for complete search history.

(56) References Cited

U.S. PATENT DOCUMENTS

| | | | |
|---|---|---|---|
| 2009/0122854 A1* | 5/2009 | Zhu | H04L 25/0224 |
| | | | 375/232 |
| 2012/0213111 A1 | 8/2012 | Shimezawa et al. | |
| 2013/0101008 A1* | 4/2013 | Tseng | H04B 7/0452 |
| | | | 375/267 |
| 2021/0211912 A1* | 7/2021 | Zeng | H04L 5/1461 |

FOREIGN PATENT DOCUMENTS

| | | |
|---|---|---|
| CN | 104919715 A | 9/2015 |
| CN | 106411457 A | 2/2017 |
| CN | 108418770 A | 8/2018 |
| CN | 108933745 A | 12/2018 |

(Continued)

OTHER PUBLICATIONS

Haifan Yin et al: "Addressing the curse of mobility in massive MIMO with Prony-based angular-delay domain channel predictions", arxiv.org, Cornell University Library, 201 Olin Library Cornell University Ithaca, NY 14853, Dec. 24, 2019, XP081563996, 14 pages.*

(Continued)

*Primary Examiner* — Jae Y Lee
*Assistant Examiner* — Haeshil Jessica Choi
(74) *Attorney, Agent, or Firm* — HAUPTMAN HAM, LLP

(57) ABSTRACT

A method for predicting channel state information includes determining, by a user equipment, channel prediction information based on a reference signal from a network device, and sending channel prediction information. The channel prediction information is useable to predict the channel information.

9 Claims, 5 Drawing Sheets

A plurality of users in a
time-varying channel

(56)          References Cited

FOREIGN PATENT DOCUMENTS

| CN | 110430147 | A | 11/2019 | |
| CN | 110830133 | A | 2/2020 | |
| CN | 110830138 | A | 2/2020 | |
| WO | 2014073846 | A1 | 5/2014 | |
| WO | WO-2019138156 | A1 * | 7/2019 | ........... H04B 17/318 |

OTHER PUBLICATIONS

Extended European Search Report issued in corresponding European Application No. 20919779.7, dated Dec. 16, 2022, pp. 1-10.

* cited by examiner

Interference between a
plurality of users

*v3*

*v2*

Channel state
information

*v1*

A plurality of users in a
time-varying channel

Predicted part

Time

Time

Antenna

Radio frequency circuit

Memory          Processor

Input/Output apparatus

31

33

32

METHOD FOR PREDICTING CHANNEL STATE INFORMATION AND APPARATUS

CROSS-REFERENCE TO RELATED APPLICATIONS

This application is a continuation of International Application No. PCT/CN2020/076282, filed on Feb. 21, 2020, the disclosure of which is hereby incorporated by reference in its entirety

TECHNICAL FIELD

This application relates to the field of communication technologies, and in particular, to a method for predicting channel state information and an apparatus.

BACKGROUND

A next-generation wireless communication system, for example, a $5^{th}$ generation (5G) communication system, has a higher requirement on a system capacity, spectral efficiency, and the like. In the 5G communication system, a massive multiple input multiple output (MIMO) technology plays a critical role in system spectral efficiency. When the MIMO technology is used, a base station performs modulation and coding and signal precoding when sending data to user equipment (UE). How the base station sends the data to the user equipment depends on channel state information (CSI) fed back by the user equipment to the base station.

In a time division duplex (TDD) system, because an uplink channel and a downlink channel use a same bandwidth, and the uplink channel and the downlink channel have reciprocity, a base station may obtain CSI of the downlink channel through the uplink channel based on the reciprocity between the uplink channel and the downlink channel, to perform signal precoding.

In a frequency division duplex (FDD) system, because an interval between an uplink frequency band and a downlink frequency band is far greater than a coherence bandwidth, uplink and downlink channels do not have complete reciprocity, and uplink channel information cannot be directly used to perform accurate downlink precoding. A base station depends on CSI fed back by user equipment to the base station.

A key factor affecting system performance is a matching degree between fed-back CSI and channel CSI during downlink transmission. However, in the FDD system, because the user equipment performs measurement and feedback, there is usually a delay in fed-back CSI, and consequently, the CSI obtained by the base station expires. In other words, there is a delay between the CSI that is obtained by the base station and fed back by the user equipment and CSI during physical downlink shared channel (PDSCH) transmission. Consequently, there is an error between precoding that is calculated by the base station based on the CSI fed back by the user equipment and that is used for data transmission and optimal precoding corresponding to an actual channel, and this causes a performance loss in downlink data transmission. In a scenario of a time-varying channel (for example, a scenario in which user equipment moves), a performance loss caused by channel expiration is more obvious. In a scenario in which a plurality of users move, a performance loss is even greater. As shown in FIG. 1, in the scenario in which the plurality of users move, CSI expiration of a plurality of user equipments causes a problem that precoding used for data transmission of the plurality of users cannot match a real channel condition. Consequently, interference between users is caused, and system performance is greatly reduced.

SUMMARY

One or more embodiments of the present application provide a method for predicting channel state information and an apparatus, to obtain channel prediction information and improve accuracy and timeliness of channel information.

According to a first aspect, a method for predicting channel state information is provided, including: determining channel prediction information based on a reference signal sent by a network device, where the channel prediction information is used to predict channel information; and sending the channel prediction information. In this aspect, user equipment sends the channel prediction information to the network device, and the network device can accurately predict the channel information in a timely manner based on the channel prediction information. This resolves an expiration problem of the channel information fed back by the user equipment. In addition, this is applicable to a scenario in which the user equipment moves because the channel information may change at each moment.

According to a second aspect, a method for predicting channel state information is provided, including: sending a reference signal; and receiving channel prediction information determined by user equipment based on the reference signal, where the channel prediction information is used to predict channel information. In this aspect, a network device receives the channel prediction information sent by the user equipment, and the network device can accurately predict the channel information in a timely manner based on the channel prediction information. This resolves an expiration problem of the channel information fed back by the user equipment. In addition, this is applicable to a scenario in which the user equipment moves because the channel information may change at each moment.

With reference to the first aspect or the second aspect, in some embodiments, the channel information is constructed based on a group of angle vectors and a group of delay vectors. Each angle vector is constructed based on an angle parameter corresponding to the angle vector, and each delay vector is constructed based on a delay parameter corresponding to the delay vector. The channel prediction information includes angle prediction information and delay prediction information, the angle prediction information is used to predict the angle parameter, and the delay prediction information is used to predict the delay parameter. In some embodiments, the user equipment may separately feed back the angle prediction information and the delay prediction information by using two pieces of signaling. The network device may separately obtain the angle prediction information and the delay prediction information, to separately predict an angle parameter and a delay parameter at a future moment based on the angle prediction information and the delay prediction information.

With reference to the first aspect or the second aspect, in some embodiments, at a moment n, an angle parameter $\theta_{l1}(n)$ corresponding to an angle vector l1 satisfies:

$$\theta_{l1}(n) = \sum_{j=1}^{p1} \alpha_{l1}(j)\theta_{l1}(n-j)$$

$\theta_{l1}(n-j)$ is an angle parameter at a moment $n-j$, $\alpha_{l1}(j)$ is angle prediction information, and $p1 \geq 1$.

In some embodiments, the user equipment may determine the angle prediction information based on angle parameters at p1 moments by using an autoregressive (AR) model, and send the angle prediction information to the network device. Therefore, the network device may predict an angle parameter at a subsequent moment based on the angle prediction information, to obtain an angle parameter in a timely manner, and this resolves a channel information expiration problem. In addition, the angle parameters at the p1 moments are changeable, that is, a predicted angle parameter is applicable to a scenario in which the user equipment moves. The network device sends reference signals at N moments, where p1 may be less than or equal to N.

With reference to the first aspect or the second aspect, in some embodiments, at the moment n, a delay parameter $\tau_{l2}(n)$ of a delay vector l2 satisfies:

$$\tau_{l2}(n) = \sum_{j=1}^{p2} \beta_{l2}(j) \tau_{l2}(n-j)$$

$\tau_{l2}(n-j)$ is a delay parameter at the moment $n-j$, $\beta_{l2}(j)$ is delay prediction information, and $p2 \geq 1$.

In some embodiments, the user equipment may determine the delay prediction information based on delay parameters at p2 moments by using an AR model, and send the delay prediction information to the network device. The network device may predict a delay parameter at a subsequent moment based on the delay prediction information, so that the network device can obtain a delay parameter in a timely manner, to resolve a channel information expiration problem. In addition, the delay parameters at the p2 moments are changeable, that is, a predicted delay parameter is applicable to a scenario in which the user equipment moves. The network device sends reference signals at N moments, where p2 may be less than or equal to N. p2 may be the same as or different from p1.

With reference to the first aspect or the second aspect, in some embodiments, the channel information is constructed based on a weighted sum of a group of angle-delay pairs. Each angle-delay pair corresponds to a weighting coefficient and is constructed based on an angle vector in the group of angle vectors and a delay vector in the group of delay vectors. The channel prediction information further includes weighting coefficient prediction information used to predict the weighting coefficient.

In some embodiments, the weighting coefficient is used to perform linear weighting on angle information and delay information. The weighting coefficient may be predicted by using the AR model, or the user equipment may send N weighting coefficients to the network device.

With reference to the first aspect or the second aspect, in some embodiments, the channel information is constructed based on a group of angle-delay pairs. Each angle-delay pair is constructed based on an angle vector and a delay vector, each angle vector is constructed based on an angle parameter corresponding to the angle vector, and each delay vector is constructed based on a delay parameter corresponding to the delay vector. The channel prediction information includes angle-delay pair prediction information used to predict an angle-delay parameter corresponding to the angle-delay pair, and the angle-delay parameter includes the angle parameter and the delay parameter. In some embodiments, the user equipment may feed back the angle-delay pair prediction information by using a piece of signaling. The network device may accurately obtain a predicted angle parameter and a predicted delay parameter at a future moment in a timely manner based on the angle-delay pair prediction information. The angle parameter and the delay parameter correspond to a piece of angle-delay pair prediction information, but the angle parameter and the delay parameter may be independent parameters or correlated parameters.

With reference to the first aspect or the second aspect, in a further possible embodiments, at a moment n, an angle-delay parameter $$\begin{bmatrix} \theta_{l3}(n) \\ \tau_{l3}(n) \end{bmatrix}$$

corresponding to an angle-delay pair 13 satisfies:

$$\begin{bmatrix} \theta_{l3}(n) \\ \tau_{l3}(n) \end{bmatrix} = \sum_{j=1}^{p3} \gamma_{l3}(j) \begin{bmatrix} \theta_{l3}(n-j) \\ \tau_{l3}(n-j) \end{bmatrix}$$

$\theta_{l3}(n)$ is an angle parameter at the moment n, $\tau_{l3}(n)$ is a delay parameter at the moment n, $$\begin{bmatrix} \theta_{l3}(n-j) \\ \tau_{l3}(n-j) \end{bmatrix}$$

is an angle-delay parameter at a moment $n-j$, $\theta_{l3}(n-j)$ is an angle parameter at the moment $n-j$, $\tau_{l3}(n-j)$ is a delay parameter at the moment $n-j$, $\gamma_{l3}(j)$ is angle-delay pair prediction information, and $p3 \geq 1$.

In some embodiments, the angle parameter and the delay parameter are two independent parameters. However, the angle parameter and the delay parameter correspond to a piece of angle-delay pair prediction information, and the angle-delay pair prediction information may be fed back by using a piece of signaling.

With reference to the first aspect or the second aspect, in some embodiments, at a moment n, an angle-delay parameter $$\begin{bmatrix} \theta_{l4}(n) \\ \tau_{l4}(n) \end{bmatrix}$$

corresponding to an angle-delay pair 14 satisfies:

$$\begin{bmatrix} \theta_{l4}(n) \\ \tau_{l4}(n) \end{bmatrix} = \sum_{j=1}^{p4} \begin{bmatrix} \gamma_{l4,1}(j) \gamma_{l4,2}(j) \\ \gamma_{l4,3}(j) \gamma_{l4,4}(j) \end{bmatrix} \begin{bmatrix} \theta_{l4}(n-j) \\ \tau_{l4}(n-j) \end{bmatrix}$$

$\theta_{l4}(n)$ is an angle parameter at the moment n, $\tau_{l4}(n)$ is a delay parameter at the moment n, $$\begin{bmatrix} \theta_{l4}(n-j) \\ \tau_{l4}(n-j) \end{bmatrix}$$

is an angle-delay parameter at a moment $n-j$, $\tau_{l4}(n-j)$ is an angle parameter at the moment $n-j$, $\tau_{l4}(n-j)$ is a delay parameter at the moment $n-j$, $$\begin{bmatrix} \gamma_{l4,1}(j)\gamma_{l4,2}(j) \\ \gamma_{l4,3}(j)\gamma_{l4,4}(j) \end{bmatrix}$$

is angle-delay pair prediction information, and p4≥1.

In some embodiments, the angle parameter and the delay parameter are two related parameters. The angle parameter and the delay parameter correspond to a piece of angle-delay pair prediction information, and the angle-delay pair prediction information may be fed back by using a piece of signaling.

With reference to the first aspect or the second aspect, in some embodiments, the channel information is constructed based on a weighted sum of the group of angle-delay pairs, each angle-delay pair corresponds to a weighting coefficient, and the channel prediction information further includes weighting coefficient prediction information used to predict the weighting coefficient.

In some embodiments, the weighting coefficient is used to perform linear weighting on angle information and delay information. The weighting coefficient may be predicted by using the AR model, or the user equipment may send N weighting coefficients to the network device.

With reference to the first aspect or the second aspect, in some embodiments, each piece of prediction information is predicted based on an autoregressive algorithm.

In some embodiments, the AR model is a method for processing time series and is used to predict a current value $x_t$ based on historical values of a variable such as x, that is, $x_1$ to $x_{t-1}$. It is assumed that the current value of the variable is obtained through linear transformation of the historical values. In a communication system, a channel change rule may also be modeled by using the AR model, that is, current channel information may be accurately predicted based on historical channel information by using the AR model.

According to a third aspect, a communication apparatus is provided, and can implement the method for predicting channel state information according to any one of the first aspect or the foregoing embodiments. For example, the communication apparatus may be a chip (for example, a baseband chip or a communication chip) or user equipment. The foregoing method may be implemented by software, hardware, or hardware executing corresponding software.

In some embodiments, a processor and a memory are included in a structure of the communication apparatus. The processor is configured to support the apparatus in performing a corresponding function in the foregoing method for predicting channel state information. The memory is configured to be coupled to the processor, and stores a program (instructions) necessary for the apparatus and/or data necessary for the apparatus. In some embodiments, the communication apparatus may further include a communication interface, configured to support communication between the apparatus and another network element.

In some embodiments, the communication apparatus may include a unit or a module for performing a corresponding function or action in the foregoing method.

In some embodiments, a processor and a transceiver apparatus are included. The processor is coupled to the transceiver apparatus. The processor is configured to execute a computer program or instructions, to control the transceiver apparatus to receive and send information. When the processor executes the computer program or the instructions, the processor is further configured to implement the foregoing method. For example, the transceiver apparatus may be a transceiver, a transceiver circuit, or an input/output interface. When the communication apparatus is a chip, the transceiver apparatus is a transceiver circuit or an input/output interface.

When the communication apparatus is a chip, a sending unit may be an output unit, for example, an output circuit or a communication interface, and a receiving unit may be an input unit, for example, an input circuit or a communication interface. When the communication apparatus is a network device, a sending unit may be a transmitter or a transmitter machine, and a receiving unit may be a receiver or a receiver machine.

According to a fourth aspect, a communication apparatus is provided, and can implement the method for predicting channel state information according to any one of the second aspect or the foregoing embodiments. For example, the communication apparatus may be a chip (for example, a baseband chip or a communication chip) or a network device. The foregoing method may be implemented by software, hardware, or hardware executing corresponding software.

In some embodiments, a processor and a memory are included in a structure of the communication apparatus. The processor is configured to support the apparatus in performing a corresponding function in the foregoing method for predicting channel state information. The memory is configured to be coupled to the processor, and stores a program (instructions) necessary for the apparatus and data necessary for the apparatus. In some embodiments, the communication apparatus may further include a communication interface, configured to support communication between the apparatus and another network element.

In some embodiments, the communication apparatus may include a unit or a module for performing a corresponding action in the foregoing method.

In some embodiments, a processor and a transceiver apparatus are included. The processor is coupled to the transceiver apparatus. The processor is configured to execute a computer program or instructions, to control the transceiver apparatus to receive and send information. When the processor executes the computer program or the instructions, the processor is further configured to implement the foregoing method. For example, the transceiver apparatus may be a transceiver, a transceiver circuit, or an input/output interface. When the communication apparatus is a chip, the transceiver apparatus is a transceiver circuit or an input/output interface.

When the communication apparatus is a chip, a receiving unit may be an input unit, for example, an input circuit or a communication interface, and a sending unit may be an output unit, for example, an output circuit or a communication interface. When the communication apparatus is user equipment, a receiving unit may be a receiver (which may also be referred to as a receiver machine), and a sending unit may be a transmitter (which may also be referred to as a transmitter machine).

It may be understood that, in embodiments of this application, hardware parts that are responsible for input and output in the communication apparatus may be integrated.

According to a fifth aspect, a computer-readable storage medium is provided. The computer-readable storage medium stores instructions. When the instructions are run on a computer, the computer is enabled to perform the methods according to the foregoing aspects.

According to a sixth aspect, a computer program product including instructions is provided. When the computer program product runs on a computer, the computer is enabled to perform the methods according to the foregoing aspects.

According to a seventh aspect, a communication system is provided. The system includes any foregoing communication apparatus on a network device side and/or any foregoing communication apparatus on a user equipment side.

DESCRIPTION OF EMBODIMENTS

The following describes several concepts related to embodiments of this application.

Channel state information (CSI): channel information. The CSI includes a rank indicator (RI), a channel quality indicator (CQI), a precoding matrix indicator (PMI), and the like. The RI is used by a network device to determine a quantity of streams for transmitting data to user equipment, the CQI is used by the network device to determine a modulation order and a bit rate of channel coding for transmitting data to the user equipment, and the PMI is used by the network device to determine precoding for transmitting data to the user equipment.

A channel may be described by using an angle parameter, a delay parameter, and a weighting coefficient.

An angle parameter is used to describe an angle of a specific transmission path of a channel. An angle is an included angle between a transmission path of a channel and an antenna array panel. In a MIMO scenario, if there are a plurality of transmission paths, there are a plurality of corresponding angle parameters.

A delay parameter is used to describe a delay of a specific transmission path of a channel. A delay is a time difference between a signal received by a receive end through a transmission path and the signal sent by a transmit end. In the MIMO scenario, if there are the plurality of transmission paths, there are a plurality of corresponding delay parameters.

A weighting coefficient corresponding to a transmission path may be understood as a relative signal strength and a relative phase of the transmission path.

Figure 1:
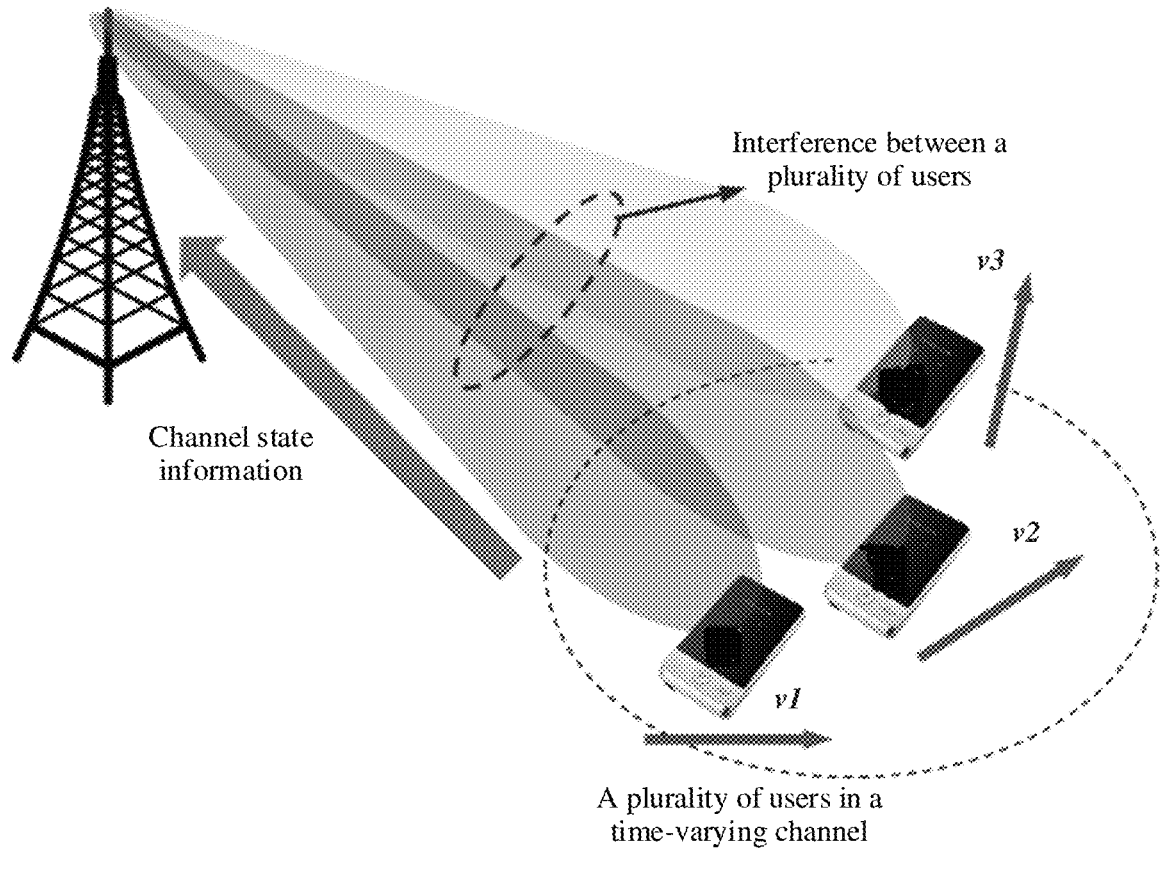
FIG. 1 is a schematic diagram of a scenario in which a plurality of users move.
Figure 2:
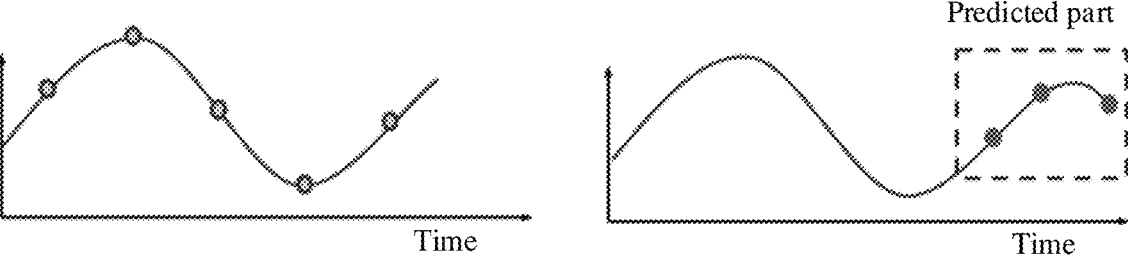
FIG. 2 is a schematic diagram of predicting channel information based on an AR model.

An AR model is a method for processing time series and is used to predict a current value x, based on historical values of a variable such as x, that is, $x_1$ to $x_{t-1}$. It is assumed that the current value of the variable is obtained through linear transformation of the historical values. In a communication system, a channel change rule may also be modeled by using the AR model, that is, current channel information may be predicted based on historical channel information by using the AR model. FIG. 2 is a schematic diagram of predicting channel information based on an AR model. It is assumed that channels at the first m moments are known, and the AR model assumes that a channel at a later moment is linear expansion of the channels at the first m moments. Then, an estimated value $\hat{h}_n$ of a channel at a future moment may be obtained by estimating an n autoregressive coefficient $a_j(n)$, and is shown in the following formula 1:

$$\hat{h}_n = \sum^{m} a_j(n)h_{n-j} + z_n \qquad \text{Formula 1}$$

$h_{n-j}$ is a channel at an $(n-j)^{th}$ moment, $a_j(n)$ is the autoregressive coefficient, and $z_n$ is an error that may exist in the AR model. In the formula, channels at m moments are used to predict a channel at a future moment, where m is an order of the AR model.

However, in the foregoing AR model-based channel prediction method, a mature channel modeling technology is not considered, and the model order m, namely a quantity of historical values that are to be used to estimate a channel, are to be selected based on empirical values. If the order is quite small, channel prediction accuracy is low. If the order is quite large, a time interval between used historical channels is quite large, and a coefficient of the AR model may have changed, and channel prediction accuracy is also not high.

Figure 3:
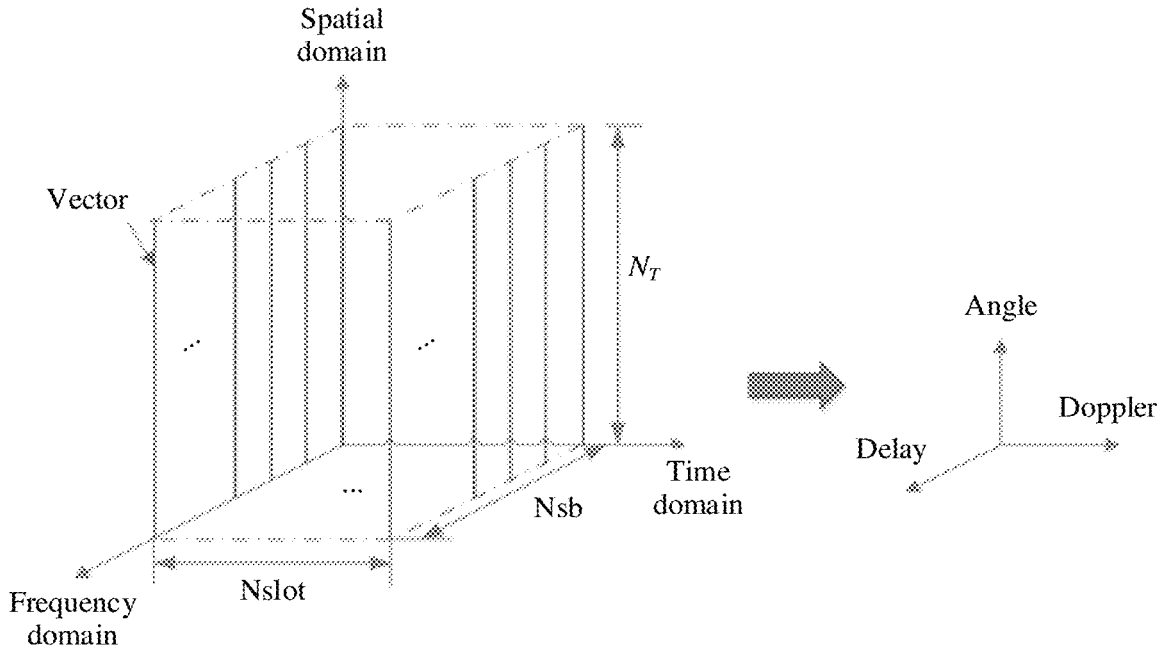
FIG. 3 is a schematic diagram of physical channel modeling.

Currently, a mature channel modeling technology is available to perform channel prediction based on a physical channel modeling technology. FIG. 3 is a schematic diagram of physical channel modeling. Generally, a channel is described by using a time domain, a frequency domain, and a spatial domain, and corresponding physical channel modeling parameters are parameters such as an angle, a multipath delay, and Doppler of the channel. Each line parallel to spatial coordinates in the figure is a vector. For example, if UE includes one receive antenna, and a base station includes 32 antennas, that is, 32 antenna ports, a length of each vector is 32. A total quantity of vectors is Nsb multiplied by Nslot.

For each instantaneous channel, the channel may be described by using an angle, a multipath delay, and a weighting coefficient, and is shown in the following formula 2:

$$H = \sum_{p=1}^{P} g_p \begin{bmatrix} e^{j2\pi f_1 \tau_p} \\ e^{j2\pi f_2 \tau_p} \\ \vdots \\ e^{j2\pi f_k \tau_p} \end{bmatrix} \begin{bmatrix} 1 & e^{\frac{j2\pi}{\lambda}\cos(\theta_p)d} & \cdots & e^{\frac{j2\pi}{\lambda}\cos(\theta_p)(M-1)d} \end{bmatrix} \qquad \text{Formula 2}$$

$g_p$ is a weighting coefficient of a $p^{th}$ path, may be a complex number or may be a real number, and may be understood as a relative signal strength and a relative phase of the path. A previous column vector is a delay vector, and a delay parameter corresponding to the delay vector is $\tau_p$. A delay is a time difference between sending a signal and receiving the signal. A next row vector is an angle vector, and an angle parameter corresponding to the angle vector is $\theta_p$. An angle is an included angle between a transmission path and an antenna array panel. M is a quantity of antennas in an antenna array. d is a physical distance between two adjacent antennas. p is a sequence number of a transmission path, and ranges from 1 to P. $f_1$ to $f_k$ are frequencies corresponding to subbands on the channel. $2$ is a signal wavelength corresponding to a center carrier of the channel.

For a change characteristic of a channel at a plurality of moments, the channel is described by using Doppler.

It can be learned from the foregoing descriptions that in wireless communication, the physical channel modeling technology becomes mature, and a physical channel may be almost described by using parameters such as an angle and a multipath delay. However, in the foregoing channel prediction method based on the physical channel modeling technology, it is usually assumed that an angle, a delay, and a Doppler parameter of a channel remain unchanged, and a change of a parameter such as an angle or a delay due to location movement of UE in an actual movement scenario is not considered. Therefore, how to obtain accurate parameters such as an angle, a delay, and a weighting coefficient and improve an expiration problem of channel information is a problem that is to be resolved in this application.

Embodiments of this application provide a method for predicting channel state information and a communication apparatus, to predict a channel in a movement scenario with reference to an AR model and a physical channel modeling technology. In this application, all parameters of a channel are allowed to change. A network device receives channel prediction information sent by user equipment, and predicts channel information based on the channel prediction information, so that the channel information can be accurately obtained in a timely manner. This resolves an expiration problem of the channel information and improves communication reliability.

Figure 4:
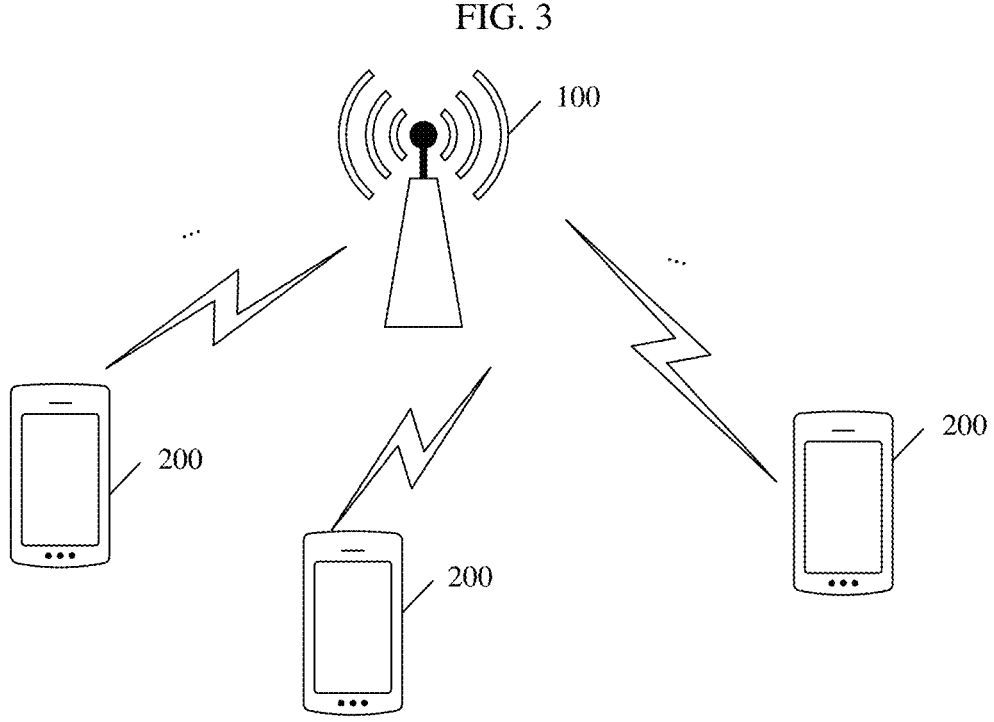
FIG. 4 is a schematic diagram of an architecture of a communication system to which an embodiment of this application is applicable.

FIG. 4 is a schematic diagram of an architecture of a communication system to which an embodiment of this application is applicable. The communication system may include at least one network device 100 (where only one is shown) and one or more user equipments 200 connected to the network device 100.

The network device 100 may be a device that can communicate with user equipment. The network device 100 may be any device having a wireless transceiver function, and includes but is not limited to a NodeB, an evolved NodeB, a base station in a fifth generation (5G) communication system, a base station in a future communication system, an access node in a Wi-Fi system, a wireless relay node, a wireless backhaul node, and the like. The base station may be a radio controller in a cloud radio access network (CRAN) scenario. Alternatively, the base station may be a small cell, a transmission reception point (TRP), a gNB, a 6G-oriented NodeB, or the like. A specific technology and a specific device form used by the base station are not limited in embodiments of this application.

User equipment in this application is a device having a wireless transceiver function, and may be deployed on land, including an indoor device, an outdoor device, a handheld device, a wearable device, or a vehicle-mounted device; may be deployed on water, for example, on a ship; or may be deployed in the air, for example, on a plane, a balloon, or a satellite. A terminal may be a mobile phone, a tablet computer (pad), a computer having a wireless transceiver function, virtual reality (VR) user equipment, augmented reality (AR) user equipment, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a wearable device, a vehicle-mounted device, or the like. An application scenario is not limited in embodiments of this application. Sometimes, the user equipment may also be referred to as access user equipment, a UE unit, a mobile station, a remote station, remote user equipment, a mobile device, a wireless communication device, a UE agent, a UE apparatus, or the like.

It should be noted that the terms "system" and "network" may be used interchangeably in embodiments of this application. "A plurality of" means two or more. In view of this, "a plurality of" may also be understood as "at least two" in embodiments of this application. The term "and/or" describes an association relationship between associated objects and represents that three relationships may exist. For example, A and/or B may represent the following three cases: Only A exists, both A and B exist, and only B exists. In addition, the character "/" generally indicates an "or" relationship between the associated objects unless otherwise specified.

Figure 5:
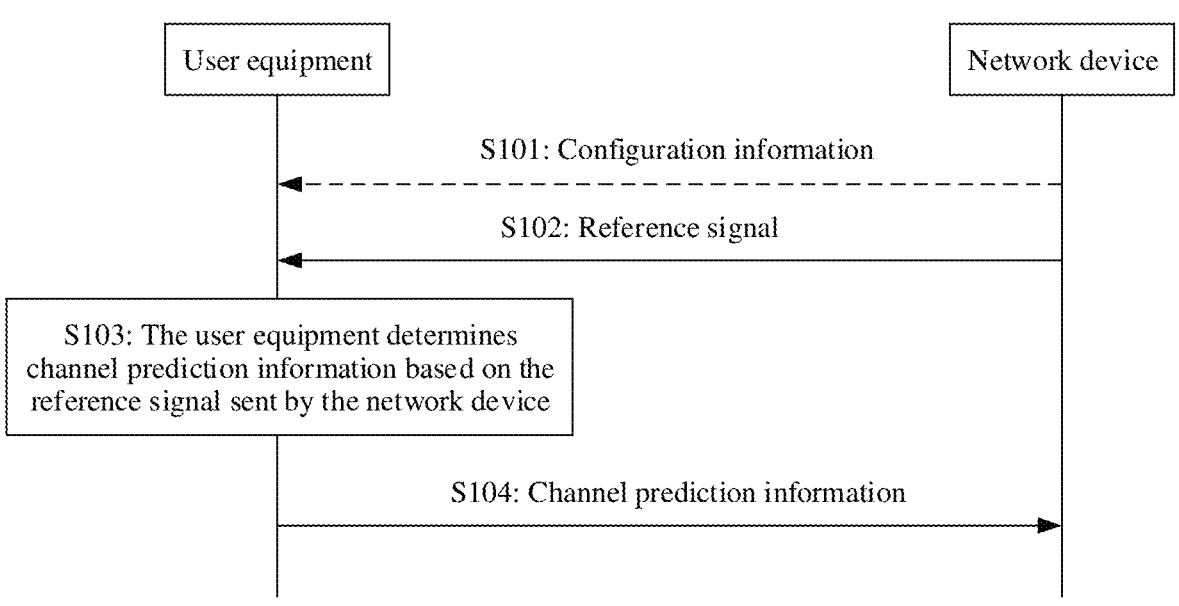
FIG. 5 is a schematic flowchart of a method for predicting channel state information according to an embodiment of this application.

FIG. 5 is a schematic flowchart of a method for predicting channel state information according to an embodiment of this application. The method may include the following operations.

S101: A network device sends configuration information to user equipment.

Correspondingly, the user equipment receives the configuration information.

This operation is optional. The network device may send radio resource control (RRC) signaling, a media access control-control element (MAC-CE), or the like to the user equipment, and include the configuration information in the RRC signaling or the MAC-CE. The configuration information may be carried in a reserved field or a user-defined field of the RRC signaling, the MAC-CE, or the like. The configuration information is used to configure channel prediction information that the UE feeds back. The channel prediction information may include an angle parameter, a delay parameter, a quantity of weighting coefficients, angle prediction information, delay prediction information, weighting coefficient prediction information, a prediction order, and the like. The UE receives the RRC signaling, the MAC-CE, or the like, and obtains the configuration information carried in the RRC signaling, the MAC-CE, or the like.

S102: The network device sends a reference signal to the user equipment.

Correspondingly, the user equipment receives the reference signal.

The reference signal may also be referred to as a pilot. During same measurement, the network device may send reference signals at N moments. N is an integer greater than or equal to 1. The N moments may be continuous or discontinuous.

It may be understood that the network device first sends information about a time-frequency resource location of the reference signal to the UE, and the UE accurately receives, at the time-frequency resource location, the reference signal sent by the network device.

S103: The user equipment determines channel prediction information based on the reference signal sent by the network device, where the channel prediction information is used to predict channel information.

The UE measures the reference signal sent by the network device, to obtain channel parameters at the N moments. The channel parameters include an angle parameter, a delay parameter, a weighting coefficient, and the like. The UE determines channel prediction information corresponding to channel parameters by using the channel parameters at the N moments or channel parameters at M moments of the N moments, where M<N. The channel prediction information may be used to predict future channel information, so that the network device can predict each channel parameter based on the channel prediction information. Accuracy of a predicted channel parameter is high, and a delay problem of channel information is resolved. The channel prediction information includes the angle prediction information, the delay prediction information, or angle-delay pair prediction information, and may further include the weighting coefficient prediction information.

In some embodiments, the channel information is constructed based on a group of angle vectors and a group of delay vectors. Each angle vector is constructed based on an angle parameter corresponding to the angle vector, and each delay vector is constructed based on a delay parameter corresponding to the delay vector. The channel prediction information includes the angle prediction information and the delay prediction information. The angle prediction information is used to predict the angle parameter, and the delay prediction information is used to predict the delay parameter.

Specifically, the angle parameter and the delay parameter are changeable. The user equipment determines angle prediction information of an angle AR model based on a relationship that is between angle parameters at a plurality of moments and that is obtained through measurement, and determines delay prediction information of a delay AR model based on a relationship that is between delay parameters at a plurality of moments and that is obtained through measurement. The determined angle prediction information is not correlated with the determined delay prediction information. The user equipment may separately feed back the angle prediction information and the delay prediction information by using two pieces of signaling. The network device may separately obtain the angle prediction information and the delay prediction information, to separately predict an angle parameter at a future moment based on the angle prediction information and predict a delay parameter at a future moment based on the delay prediction information.

The user equipment may determine angle prediction information $\alpha_{l1}(j)$ based on angle parameters at p1 moments by using an AR model, and at a moment n, an angle parameter $\theta_{l1}(n)$ corresponding to an angle vector l1 satisfies a formula 3:

$$\theta_{l1}(n) = \sum_{j=1}^{p1} \alpha_{l1}(j)\theta_{l1}(n-j) \qquad \text{Formula 3}$$

$\theta_{l1}(n-j)$ is an angle parameter at a moment n−j, $\alpha_{l1}(j)$ is the angle prediction information, p1 is an order of the angle AR model, and p1≥1. p1 may be less than or equal to N. Generally, p1 may be 3.

After receiving the angle prediction information and the p1 angle parameters, the network device may obtain an angle parameter at a future moment in a timely manner, to resolve a channel information expiration problem. In addition, the angle parameters at the p1 moments are changeable, that is, the predicted angle parameter is applicable to a scenario in which the user equipment moves.

The user equipment may determine delay prediction information $\beta_{l2}(j)$ based on delay parameters at p2 moments by using an AR model, and at the moment n, a delay parameter $\tau_{l2}(n)$ of a delay vector l2 satisfies a formula 4:

$$\tau_{l2}(n) = \sum_{j=1}^{p2} \beta_{l2}(j)\tau_{l2}(n-j) \qquad \text{Formula 4}$$

$\tau_{2}(n-j)$ is a delay parameter at the moment n−j, $\beta_{l2}(j)$ is the delay prediction information, p2 is an order of the delay AR model, and p2≥1. p2 may be less than or equal to N. Generally, p2 may be 3.

After receiving the delay prediction information and p2 delay parameters, the network device may obtain a delay parameter at a future moment in a timely manner, to resolve a channel information expiration problem. In addition, the delay parameters at the p2 moments are changeable, that is, the predicted delay parameter is applicable to a scenario in which the user equipment moves.

In some embodiments, p2 may be the same as or different from p1.

Further, the channel information is constructed based on a weighted sum of a group of angle-delay pairs, each angle-delay pair corresponds to a weighting coefficient and is constructed based on an angle vector in the group of angle vectors and a delay vector in the group of delay vectors, and the channel prediction information further includes weighting coefficient prediction information used to predict the weighting coefficient.

The weighting coefficient may be predicted by using an AR model, or the user equipment may send N weighting coefficients to the network device. When prediction is performed by using the AR model, the weighting coefficient prediction information may be determined based on angle-delay pairs at a plurality of moments. The weighting coefficient may be a complex number, or may be a real number.

In some embodiments, the channel information is constructed based on a group of angle-delay pairs, each angle-delay pair is constructed based on an angle vector and a delay vector, each angle vector is constructed based on an angle parameter corresponding to the angle vector, each delay vector is constructed based on a delay parameter corresponding to the delay vector, the channel prediction information includes angle-delay pair prediction information used to predict an angle-delay parameter corresponding to the angle-delay pair, and the angle-delay pair includes the angle parameter and the delay parameter.

Specifically, the user equipment constructs an angle-delay pair based on an angle vector and a delay vector, to obtain a group of constructed angle-delay pairs. The user equipment may determine the angle-delay pair prediction information of the AR model based on angle-delay parameters at a plurality of moments obtained through measurement. The user equipment may feed back the angle-delay pair prediction information by using a piece of signaling. The network device may obtain a predicted angle parameter and a predicted delay parameter based on angle-delay parameters. The angle parameter and the delay parameter correspond to a piece of angle-delay pair prediction information. The angle parameter and the delay parameter may be independent parameters or correlated parameters.

The angle parameter and the delay parameter may be independent parameters. The user equipment may determine angle-delay pair prediction information $\gamma_{l3}(j)$ of the AR model based on angle parameters and delay parameters at p3 moments by using the AR model, and at the moment n, an angle-delay parameter $$\begin{bmatrix} \theta_{l3}(n) \\ \tau_{l3}(n) \end{bmatrix}$$

corresponding to an angle-delay pair 13 satisfies a formula 5:

$$\begin{bmatrix} \theta_{l3}(n) \\ \tau_{l3}(n) \end{bmatrix} = \sum_{j=1}^{p3} \gamma_{l3}(j) \begin{bmatrix} \theta_{l3}(n-j) \\ \tau_{l3}(n-j) \end{bmatrix} \qquad \text{Formula 5}$$

$\theta_{l3}(n)$ is an angle parameter at the moment n, $\tau_{l3}(n)$ is a delay parameter at the moment n, $$\begin{bmatrix} \theta_{l3}(n-j) \\ \tau_{l3}(n-j) \end{bmatrix}$$

is an angle-delay parameter at the moment n−j, $\theta_{l3}(n-j)$ is an angle parameter at the moment n−j, $\tau_{l3}(n-j)$ is a delay parameter at the moment n−j, $\gamma_{l3}(j)$ is the angle-delay pair prediction information, p3 is an order of an angle-delay AR model, p3≥1, and p3 may be less than or equal to N. Generally, p3 may be 3.

Because the angle parameter and the delay parameter correspond to a piece of angle-delay pair prediction information, the user equipment may feed back the angle-delay pair prediction information by using a piece of signaling. After receiving the angle-delay pair prediction information, and the angle parameters and the delay parameters at the p3 moments, the network device may obtain an angle-delay parameter at a future moment in a timely manner, to resolve a channel information expiration problem. In addition, the angle parameters and the delay parameters at the p3 moments are changeable, that is, the predicted angle parameter and the predicted delay parameter is applicable to a scenario in which the user equipment moves.

The angle parameter and the delay parameter may be correlated parameters. The user equipment determines angle-delay pair prediction information of the AR model based on angle parameters and delay parameters at p4 moments by using the AR model, and at the moment n, an angle-delay parameter $$\begin{bmatrix} \theta_{l4}(n) \\ \tau_{l4}(n) \end{bmatrix}$$

corresponding to an angle-delay pair 14 satisfies a formula 6:

$$\begin{bmatrix} \theta_{l4}(n) \\ \tau_{l4}(n) \end{bmatrix} = \sum_{j=1}^{p4} \begin{bmatrix} \gamma_{l4,1}(j) & \gamma_{l4,2}(j) \\ \gamma_{l4,3}(j) & \gamma_{l4,4}(j) \end{bmatrix} \begin{bmatrix} \theta_{l4}(n-j) \\ \tau_{l4}(n-j) \end{bmatrix} \qquad \text{Formula 6}$$

$\theta_{l4}(n)$ is an angle parameter at the moment n, $\tau_{l4}(n)$ is a delay parameter at the moment n, $$\begin{bmatrix} \theta_{l4}(n-j) \\ \tau_{l4}(n-j) \end{bmatrix}$$

is an angle-delay parameter at the moment n−j, $\theta_{l4}(n-j)$ is an angle parameter at the moment n−j, $\tau_{l4}(n-j)$ is a delay parameter at the moment n−j, $$\begin{bmatrix} \gamma_{l4,1}(j) & \gamma_{l4,2}(j) \\ \gamma_{l4,3}(j) & \gamma_{l4,4}(j) \end{bmatrix}$$

is the angle-delay pair prediction information, p4 is an order of an angle-delay AR model, p4≥1, and p4 may be less than or equal to N. Generally, p4 may be 3.

Because the angle parameter and the delay parameter correspond to a piece of angle-delay pair prediction information, the angle-delay pair prediction information may be fed back by using a piece of signaling. After receiving the angle-delay pair prediction information, and the angle parameters and the delay parameters at the p4 moments, the network device may obtain an angle-delay parameter at a future moment in a timely manner, to resolve a channel information expiration problem. In addition, the angle parameters and the delay parameters at the p4 moments are changeable, that is, the predicted angle parameter and the predicted delay parameter is applicable to a scenario in which the user equipment moves.

Further, the channel information is constructed based on a weighted sum of the group of angle-delay pairs, each angle-delay pair corresponds to a weighting coefficient, and the channel prediction information further includes weighting coefficient prediction information used to predict the weighting coefficient.

The weighting coefficient is used to perform linear weighting on angle information and delay information. The weighting coefficient may be predicted by using the AR model, or the user equipment may send N weighting coefficients to the network device. When prediction is performed by using the AR model, the weighting coefficient prediction information may be determined based on angle-delay pairs at a plurality of moments. The weighting coefficient may be a complex number, or may be a real number.

In some embodiments, each piece of prediction information is predicted based on an autoregressive algorithm. Because an AR model is a method for processing time series and is used to predict a current value $x_t$ based on historical values of a variable such as x, that is, $x_1$ to $x_{t-1}$. It is assumed that the current value of the variable is obtained through linear transformation of the historical values. In a communication system, a channel change rule may also be modeled by using the AR model, that is, current channel information may be accurately predicted based on historical channel information by using the AR model.

S104: The user equipment sends the channel prediction information to the network device.

Correspondingly, the network device receives the channel prediction information.

After receiving the channel prediction information, the network device may further receive channel information at a plurality of moments, and may predict channel information at a future moment based on the channel prediction information and the channel information at the plurality of moments.

According to the method for predicting channel state information provided in this embodiment of this application, the user equipment sends the channel prediction information to the network device, and the network device can accurately predict the channel information in a timely manner based on the channel prediction information. This resolves an expiration problem of the channel information fed back by the user equipment, and is applicable to the scenario in which the user equipment moves.

Figure 6:
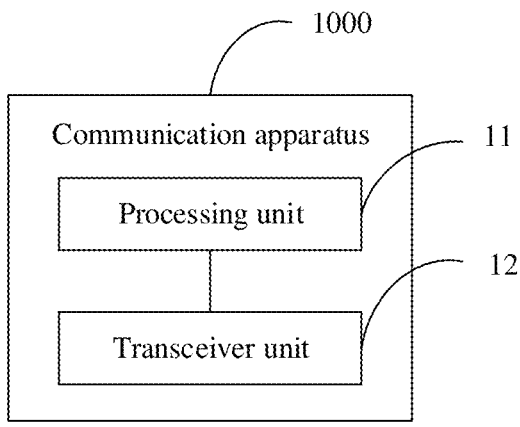
FIG. 6 is a schematic structural diagram of modules of a communication apparatus according to an embodiment of this application.

Based on a same concept as the foregoing method for predicting channel state information, an embodiment of this application further provides a communication apparatus. The communication apparatus may be the user equipment in the embodiment shown in FIG. 5. FIG. 6 is a schematic structural diagram of a communication apparatus 1000 according to an embodiment of this application. The communication apparatus 1000 includes a processing unit 11 and a transceiver unit 12.

The processing unit 11 is configured to determine channel prediction information based on a reference signal sent by a network device, where the channel prediction information is used to predict channel information; and the transceiver unit 12 is configured to send the channel prediction information.

For some embodiments of the processing unit 11 and the transceiver unit 12, refer to the descriptions of the user equipment in the embodiment shown in FIG. 5. Details are not described herein again.

According to the communication apparatus provided in this embodiment of this application, the user equipment sends the channel prediction information to the network device, and the network device can accurately predict the channel information in a timely manner based on the channel prediction information. This resolves an expiration problem of the channel information fed back by the user equipment, and is applicable to a scenario in which the user equipment moves.

Figure 7:
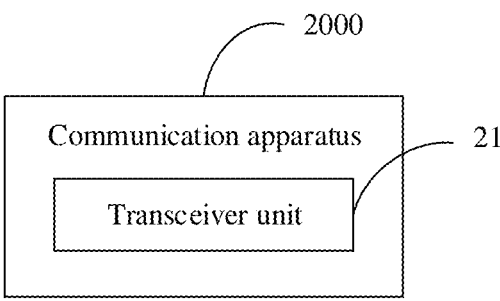
FIG. 7 is a schematic structural diagram of modules of another communication apparatus according to an embodiment of this application.

Based on a same concept as the foregoing method for predicting channel state information, an embodiment of this application further provides a communication apparatus. The communication apparatus may be the network device in the embodiment shown in FIG. 5. FIG. 7 is a schematic structural diagram of another communication apparatus according to an embodiment of this application. The communication apparatus 2000 includes a transceiver unit 21.

The transceiver unit 21 is configured to send a reference signal.

The transceiver unit 21 is further configured to receive channel prediction information determined by user equipment based on the reference signal, where the channel prediction information is used to predict channel information.

For some embodiments of the transceiver unit 21, refer to the descriptions of the network device in the embodiment shown in FIG. 5. Details are not described herein again.

According to the communication apparatus provided in this embodiment of this application, the network device receives the channel prediction information sent by the user equipment, and the network device can accurately predict the channel information in a timely manner based on the channel prediction information. This resolves an expiration problem of the channel information fed back by the user equipment, and is applicable to a scenario in which the user equipment moves.

An embodiment of this application further provides a communication apparatus. The communication apparatus is configured to perform the foregoing method for predicting channel state information. A part or all of the foregoing method for predicting channel state information may be implemented by hardware, or may be implemented by software.

In some embodiments, the communication apparatus may be a chip or an integrated circuit.

In some embodiments, when a part or all of the method for predicting channel state information in the foregoing embodiment is implemented by software, the communication apparatus includes a processor that is configured to execute a program. When the program is executed, the communication apparatus is enabled to implement the method for predicting channel state information provided in the foregoing embodiment.

The communication apparatus may further include a memory that is configured to store necessary programs. These related programs may be loaded into the memory at delivery of the communication apparatus, or may be loaded into the memory for later use.

In some embodiments, the memory may be a physically independent unit, or may be integrated with the processor.

In some embodiments, when a part or all of the method for predicting channel state information in the foregoing embodiment is implemented by software, the communication apparatus may alternatively include only a processor. A memory configured to store a program is located outside the communication apparatus. The processor is connected to the memory by using a circuit/wire, and is configured to read and execute the program stored in the memory.

The processor may be a central processing unit (CPU), a network processor (NP), or a combination of the CPU and the NP.

In some embodiments, the processor may include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

Figure 8:
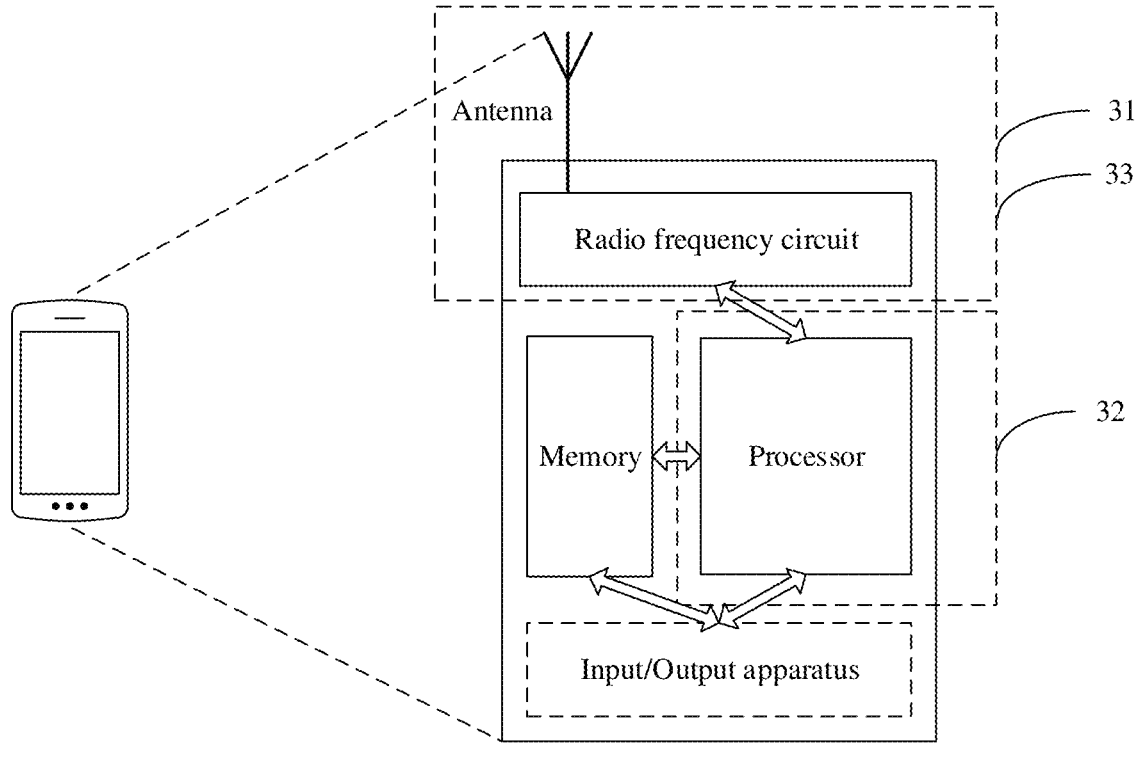
FIG. 8 is a schematic diagram of a hardware structure of user equipment according to an embodiment of this application.

FIG. 8 is a simplified schematic structural diagram of user equipment. For ease of understanding and illustration, an example in which the user equipment is a mobile phone is used in FIG. 8. As shown in FIG. 8, the user equipment includes a processor, and may further include a radio frequency circuit, an antenna, and an input/output apparatus. The processor may be configured to process a communication protocol and communication data, and may be further configured to control the user equipment, execute a software program, process data of the software program, and the like. The user equipment may further include a memory. The memory is mainly configured to store the software program and the data. These related programs may be loaded into the memory at delivery of the communication apparatus, or may be loaded into the memory when used later. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of user equipment may not have an input/output apparatus.

When data is to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the user equipment, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 8 shows only one memory and one processor. In an actual user equipment product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have transceiver functions may be considered as a receiving unit and a sending unit (which may also be collectively referred to as a transceiver unit) of the user equipment, and the processor having a processing function may be considered as a processing unit of the user equipment. As shown in FIG. 8, the user equipment includes a receiving unit 31, a processing unit 32, and a sending unit 33. The receiving unit 31 may also be referred to as a receiver, a receiver machine, a receiver circuit, or the like. The sending unit 33 may also be referred to as a sender, a transmitter, a transmitter machine, a transmitter circuit, or the like. The processing unit may also be referred to as a processor, a processing board, a processing module, a processing apparatus, or the like.

For example, in an embodiment, the receiving unit 31 is configured to perform operations S101 and S102 in the embodiment shown in FIG. 5, the processing unit 32 is configured to perform operation S103 in the embodiment shown in FIG. 5, and the sending unit 33 is configured to perform operation S104 in the embodiment shown in FIG. 5.

Figure 9:
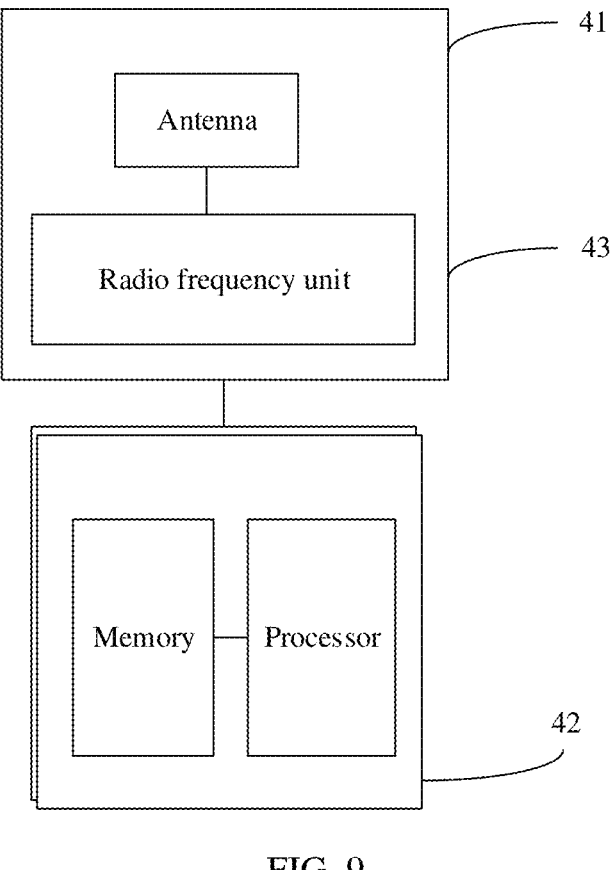
FIG. 9 is a schematic diagram of a hardware structure of a network device according to an embodiment of this application.

FIG. 9 is a simplified schematic structural diagram of a network device. The network device includes a part 42 and a part for radio frequency signal transmission/reception and conversion. The part for radio frequency signal transmission/reception and conversion further includes a receiving unit part 41 and a sending unit part 43 (which may also be collectively referred to as a transceiver unit). The part for radio frequency signal transmission/reception and conversion is mainly configured to: send/receive a radio frequency signal and perform conversion between a radio frequency signal and a baseband signal. The part 42 is mainly configured to: perform baseband processing, control the network device, and the like. The receiving unit 41 may also be referred to as a receiver, a receiver machine, a receiver circuit, or the like. The sending unit 43 may also be referred to as a sender, a transmitter, a transmitter machine, a transmitter circuit, or the like. The part 42 is usually a control center of the network device, may usually be referred to as a processing unit, and is configured to control the network device to perform operations performed by the network device in FIG. 5. For details, refer to the foregoing descriptions of the related parts.

The part 42 may include one or more boards. Each board may include one or more processors and one or more memories. The processor is configured to read and execute a program in the memory to implement a baseband processing function and control the network device. If there are a plurality of boards, the boards may be interconnected to improve a processing capability. In some embodiments, a plurality of boards may share one or more processors, a plurality of boards may share one or more memories, or a plurality of boards may simultaneously share one or more processors.

For example, in an embodiment, the sending unit 43 is configured to perform operations S101 and S102 in the embodiment shown in FIG. 5. The receiving unit 41 is configured to perform operation S104 in the embodiment shown in FIG. 5.

An embodiment of this application further provides a computer-readable storage medium. The computer-readable storage medium stores instructions. When the instructions are run on a computer, the computer is enabled to perform the foregoing method.

An embodiment of this application further provides a computer program product including instructions. When the computer program product runs on a computer, the computer is enabled to perform the foregoing method.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, division into the units is merely logical function division and may be another division manner in some embodiments. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

All or a part of the foregoing embodiments may be implemented by software, hardware, firmware, or any combination thereof. When software is used to implement the embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, such as a server or a data center. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state drive (SSD).

What is claimed is:

1. A method for predicting channel state information, comprising:

determining, by a user equipment, channel prediction information based on a reference signal from a network device, wherein the channel prediction information is useable to predict channel information; and sending, by the user equipment, the channel prediction information to the network device;

wherein the channel information is constructed based on a group of angle vectors and a group of delay vectors, each angle vector of the group of angle vectors is constructed based on a corresponding angle parameter, each delay vector of the group of delay vectors is constructed based on a corresponding delay parameter, the channel prediction information comprises angle prediction information and delay prediction information, the angle prediction information is useable to predict the corresponding angle parameter of each angle vector of the group of angle vectors, and the delay prediction information is useable to predict the corresponding delay parameter of each delay vector of the group of delay vectors;

at a first moment n, a first angle parameter $\theta_{l1}(n)$ corresponding to a first angle vector l1 satisfies:

$$\theta_{l1}(n) = \sum_{j=1}^{p1} \alpha_{l1}(j)\theta_{l1}(n-j)$$

where $\theta_{l1}(n-j)$ is a second angle parameter at a second moment $n-j$, $\alpha_{l1}(j)$ is first angle prediction information, and $p1 \geq 1$; or at the first moment n, a first delay parameter $\tau_{l2}(n)$ of a first delay vector l2 satisfies:

$$\tau_{l2}(n) = \sum_{j=1}^{p2} \beta_{l2}(j)\tau_{l2}(n-j)$$

where $\tau_{l2}(n-j)$ is a second delay parameter at the second moment $n-j$, $\beta_{l2}(j)$ is first delay prediction information, and $p2 \geq 1$.

2. The method according to claim 1, wherein the channel information is constructed based on a weighted sum of a group of angle-delay pairs, each angle-delay pair of the group of angle-delay pairs corresponds to a weighting coefficient, and is constructed based on a corresponding angle vector in a group of angle vectors and a corresponding delay vector in a group of delay vectors, and the channel prediction information comprises weighting coefficient prediction information useable to predict the weighting coefficient.

3. The method according to claim 1, wherein each piece of the channel prediction information is predicted based on an autoregressive algorithm.

4. A communication apparatus, comprising:

a transceiver;

at least one processor; and one or more non-transitory memories coupled to the at least one processor, and configured to store non-transitory instructions, and in response to being executed by the at least one processor, the non-transitory instructions cause the at least one processor to:

determine channel prediction information based on a reference signal from a network device, wherein the channel prediction information is useable to predict channel information; and the transceiver is configured to:

send the channel prediction information to the network device;

wherein the channel information is constructed based on a group of angle vectors and a group of delay vectors, each angle vector of the group of angle vectors is constructed based on a corresponding angle parameter, each delay vector of the group of delay vectors is constructed based on a corresponding delay parameter, the channel prediction information comprises angle prediction information and delay prediction information, the angle prediction information is useable to predict the corresponding angle parameter of each angle vector of the group of angle vectors, and the delay prediction information is useable to predict the corresponding delay parameter of each delay vector of the group of delay vectors;

at a first moment n, a first angle parameter $\theta_{l1}(n)$ corresponding to a first angle vector l1 satisfies:

$$\theta_{l1}(n) = \sum_{j=1}^{p1} \alpha_{l1}(j)\theta_{l1}(n-j)$$

where $\theta_{l1}(n-j)$ is a second angle parameter at a second moment $n-j$, $\alpha_{l1}(j)$ is first angle prediction information, and $p1 \geq 1$; or at the first moment n, a first delay parameter $\tau_{l2}(n)$ of a first delay vector l2 satisfies:

$$\tau_{l2}(n) = \sum_{j=1}^{p2} \beta_{l2}(j)\tau_{l2}(n-j)$$

where $\tau_{l2}(n-j)$ is a second delay parameter at the second moment $n-j$, $\beta_{l2}(j)$ is first delay prediction information, and $p2 \geq 1$.

5. The communication apparatus according to claim 4, wherein the channel information is constructed based on a weighted sum of a group of angle-delay pairs, each angle-delay pair of the group of angle-delay pairs corresponds to a weighting coefficient, and is constructed based on a corresponding angle vector in a group of angle vectors and a corresponding delay vector in a group of delay vectors, and the channel prediction information comprises weighting coefficient prediction information useable to predict the weighting coefficient.

6. The communication apparatus according to claim 4, wherein each piece of the channel prediction information is predicted based on an autoregressive algorithm.

7. A communication apparatus, comprising:

at least one processor;

one or more non-transitory memories coupled to the at least one processor, and configured to store non-transitory instructions; at least one processor and a transceiver configured to:

send a reference signal to a user equipment; and receive channel prediction information from the user equipment, the channel prediction information is determined based on the reference signal, wherein the channel prediction information is useable to predict channel information;

wherein the channel information is constructed based on a group of angle vectors and a group of delay vectors, each angle vector of the group of angle vectors is constructed based on a corresponding angle parameter, each delay vector of the group of delay vectors is constructed based on a corresponding delay parameter, the channel prediction information comprises angle prediction information and delay prediction information, the angle prediction information is useable to predict the corresponding angle parameter of each angle vector of the group of angle vectors, and the delay prediction information is useable to predict the corresponding delay parameter of each delay vector of the group of delay vectors;

at a first moment n, a first angle parameter $\theta_{l1}(n)$ corresponding to a first angle vector l1 satisfies:

$$\theta_{l1}(n) = \sum_{j=1}^{p1} \alpha_{l1}(j)\theta_{l1}(n-j)$$

where $\theta_{l1}(n-j)$ is a second angle parameter at a second moment n−j, $\alpha_{l1}(j)$ is first angle prediction information, and p1≥1; or at the first moment n, a first delay parameter $\tau_{l2}(n)$ of a first delay vector l2 satisfies:

$$\tau_{l2}(n) = \sum_{j=1}^{p2} \beta_{l2}(j)\tau_{l2}(n-j)$$

where $\tau_{l2}(n-j)$ is a second delay parameter at the second moment n−j, $\beta_{l2}(j)$ is first delay prediction information, and p2≥1.

8. The communication apparatus according to claim 7, wherein the channel information is constructed based on a weighted sum of a group of angle-delay pairs, each angle-delay pair of the group of angle-delay pairs corresponds to a weighting coefficient, and is constructed based on a corresponding angle vector in a group of angle vectors and a corresponding delay vector in a group of delay vectors, and the channel prediction information comprises weighting coefficient prediction information useable to predict the weighting coefficient.

9. The communication apparatus according to claim 7, wherein each piece of the channel prediction information is predicted based on an autoregressive algorithm.

\* \* \* \* \*